US012593304B2

(12) United States Patent
Zebulon et al.

(10) Patent No.: US 12,593,304 B2
(45) Date of Patent: Mar. 31, 2026

(54) WIRELESS LAN SIGNAL BASED MOTION DETECTION METHOD AND DEVICE

(71) Applicant: WILUS INSTITUTE OF STANDARDS AND TECHNOLOGY INC., Gyeonggi-do (KR)

(72) Inventors: Asaf Zebulon, Gyeonggi-do (KR); Fathan Adi Pranaya, Gyeonggi-do (KR); Hwanwoong Hwang, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 315 days.

(21) Appl. No.: 18/199,366

(22) Filed: May 19, 2023

(65) Prior Publication Data

US 2023/0292282 A1 Sep. 14, 2023

Related U.S. Application Data

(63) Continuation of application No. PCT/KR2022/021449, filed on Dec. 28, 2022.

(30) Foreign Application Priority Data

Dec. 29, 2021 (KR) ........................ 10-2021-0190629
Dec. 12, 2022 (KR) ........................ 10-2022-0173071

(51) Int. Cl.
*H04W 64/00* (2009.01)
*G01S 5/02* (2010.01)

(52) U.S. Cl.
CPC .......... *H04W 64/003* (2013.01); *G01S 5/021* (2013.01); *G01S 5/0294* (2013.01)

(58) Field of Classification Search
CPC ....... A61B 5/7267; A61B 5/117; G01S 7/415; G01S 13/003; G01S 13/56; G01S 13/723;
(Continued)

(56) References Cited

U.S. PATENT DOCUMENTS 10,108,903 B1 * 10/2018 Piao .......................... G06N 3/04
11,616,553 B1 * 3/2023 Kachroo ............... H04L 5/0062
375/262
(Continued)

FOREIGN PATENT DOCUMENTS

CN 109671238 4/2019
KR 10-2013-0006832 1/2013
(Continued)

OTHER PUBLICATIONS

International Search Report for PCT/KR2022/021449 mailed on Apr. 11, 2023 and its English translation by Google Translate.
(Continued)

*Primary Examiner* — Olumide Ajibade Akonai
(74) *Attorney, Agent, or Firm* — WOMBLE BOND DICKINSON (US) LLP

(57) ABSTRACT

Disclosed is a sensing device configured to perform movement detection by using a measurement value representing a channel state measured using a wireless LAN signal. The sensing device includes a memory, and a processor. The processor is configured to obtain a standard deviation of magnitudes of the measurement values over a predetermined number of measurements or within a predetermined time interval, and obtain a feature value of a sensing algorithm, based on the obtained standard deviation value. The sensing algorithm is an algorithm learned based on a correlation between a value obtained based on the magnitudes of the measurement values and the presence or absence of movement around devices exchanging the wireless LAN signal.

14 Claims, 12 Drawing Sheets

(58) Field of Classification Search

CPC .... G01S 13/52; G01S 5/0252; G01S 5/02524; G01S 5/021; G01S 5/0294; G01S 13/522; G01S 13/765; G01S 5/017; G06F 2218/12; G06F 18/24; G06F 18/241; H04B 7/0626; H04B 17/309; H04B 7/06; H04W 84/12; H04W 4/02; H04W 4/33; H04W 64/003; H04W 64/006; H04W 4/38; G08B 21/22

See application file for complete search history.

(56) References Cited

U.S. PATENT DOCUMENTS

| | | | | |
|---|---|---|---|---|
| 12,044,789 | B2 * | 7/2024 | Zandifar | G01S 5/02 |
| 2020/0191943 | A1 * | 6/2020 | Wu | G01S 13/726 |
| 2020/0323034 | A1 * | 10/2020 | Da Silva | G01S 13/003 |
| 2020/0367021 | A1 | 11/2020 | Devison et al. | |
| 2023/0109149 | A1 * | 4/2023 | Chen | H04W 64/006 |
| | | | | 455/456.1 |

FOREIGN PATENT DOCUMENTS

| | | |
|---|---|---|
| KR | 10-2020-0096493 | 8/2020 |
| KR | 10-2021-0014630 | 2/2021 |
| KR | 10-2216699 | 2/2021 |
| KR | 10-2270808 | 6/2021 |
| WO | 2017/100706 | 6/2017 |
| WO | 2019/109163 | 6/2019 |
| WO | 2021/256848 | 12/2021 |

OTHER PUBLICATIONS

Written Opinion of the International Searching Authority for PCT/KR2022/021449 mailed on Apr. 11, 2023 and its English translation by Google Translate.

Partial Supplementary European Search Report (R. 164 EPC) dated Feb. 20, 2025 for European Patent Application No. 22916723.4.

Office Action dated Mar. 26, 2025 for Korean Patent Application No. 10-2023-7015457 and its English translation provided by Applicant's foreign counsel.

Extended European Search Report dated May 19, 2025 for European Patent Application No. 22916723.4.

Pengming Hu et al.: "MiFi: Device-Free Wheat Mildew Detection Using Off-the-Shelf Wifi Devices", 2019 IEEE Global Communications Conference(GLOBECOM), Dec. 9, 2019 (Dec. 9, 2019), pp. 1-6, XP033722622.

Zehua Dong et al.: "Indoor Motion Detection Using Wi-Fi Channel State Information in Flat Floor Environments Versus in Staircase Environments", Sensors, vol. 18, No. 7, Jul. 6, 2018 (Jul. 6, 2018), p. 1-18, XP055726062.

Office Action (1st) dated Jan. 22, 2026 for European Patent Application No. 22 916 723.4.

Applicant's submission of Dec. 8, 2025 in response to the Communication pursuant to Rules 70(2) and 70a(2) EPC for European Patent Application No. 22916723.4, dated Jun. 6, 2025.

* cited by examiner

Input Value
[Windowed Data]

Calculate the magnitude of the input signal

Calculate standard deviation of all samples over time

Calculate average value over subcarriers

Calculate the minimum value over antennas

Output Value

1

WIRELESS LAN SIGNAL BASED MOTION DETECTION METHOD AND DEVICE

CROSS-REFERENCE TO RELATED APPLICATIONS

This application is a continuation of International Patent Application No. PCT/KR2022/021449 filed on Dec. 28, 2022, which claims the priority to Korean Patent Application No. 10-2021-0190629 filed in the Korean Intellectual Property Office on Dec. 29, 2021, and Korean Patent Application No. 10-2022-0173071 filed in the Korean Intellectual Property Office on Dec. 12, 2022, the entire contents of which are incorporated herein by reference.

TECHNICAL FIELD

The disclosure relates to a method and device for detecting motion by using a wireless LAN signal.

BACKGROUND ART

Recently, as the use of mobile devices becomes more widespread, wireless LAN technology, which can provide fast wireless Internet service to the devices, is becoming popular. Wireless LAN technology is a technology that allows mobile devices, such as smartphones, smart pads, laptop computers, portable multimedia players, embedded devices, to wirelessly access the Internet at home, in a business or in a specific service area, based on short-range wireless communication technology.

Along with the spread of the wireless LAN, research is also being conducted to detect motions around access points (APs) and stations by using signals exchanged between the APs and the stations of the wireless LAN. Motion detection using a wireless LAN signal does not require a user's image to be directly photographed, and thus has the advantage of minimizing unnecessary privacy exposure. However, opinions that follow-up research is needed on a method for increasing the accuracy of motion detection and a method for avoiding interfering with existing wireless LAN communications are being raised.

DISCLOSURE OF INVENTION

Technical Problem

An embodiment of the disclosure is to provide a method and device for detecting motion by using a wireless LAN signal.

Solution to Problem

According to an embodiment of the disclosure, a sensing device configured to perform movement detection by using a measurement value representing a channel state measured using a wireless LAN signal includes a memory, and a processor. The processor is configured to obtain a standard deviation of magnitudes of the measurement values over a predetermined number of measurements or within a predetermined time interval, and obtain a feature value of a sensing algorithm, based on the obtained standard deviation value. The sensing algorithm is an algorithm learned based on a correlation between a value obtained based on the magnitudes of the measurement values and a presence or absence of movement around devices exchanging the wireless LAN signal.

2

The sensing algorithm may be an algorithm learned based on a correlation between a value obtained based on magnitudes of the measurement values and a strength of the wireless LAN signal and the presence or absence of movement around devices exchanging the wireless LAN signal.

The sensing algorithm is a binary classification function with respect to motion detection, the processor may output whether a final movement has been detected, based on whether a number of detection results indicating movement detection, among a plurality of detection results determined according to an output value of the sensing algorithm during a voting period, is equal to or greater than a predetermined number. In this case, the voting period is a time interval determined by the sensing device.

The processor may adjust a sensitivity of the movement detection by adjusting a length of the voting period.

The processor may use, as the measurement value, only a measurement value of an antenna having a smallest mean value of the measurement values within a measurement window, when the wireless LAN signal is simultaneously exchanged through a plurality of antennas of one terminal, wherein the measurement window is a time interval during which measurement is performed.

The measurement value may be obtained based on a sample mean, which is a value obtained by averaging magnitudes of channel state information (CSI) values measured at an identical time point in a plurality of subcarriers transmitting the wireless LAN signal.

The measurement value may be a value filtered by a selective subcarrier shift removal filter. The selective subcarrier shift removal filter may apply Z-score normalization to samples corresponding to one or more outlier values, which are values outside a specific range, among sample mean values within a measurement window representing a time interval during which measurement is performed, and apply inverse Z-score normalization to the Z-score normalized sample by using a replacement mean and a replacement standard deviation. A minimum value in the specific range may be a value obtained by subtracting a standard deviation of sample means within a measurement range from a mean of sample means within the measurement range, and a maximum value in the specific range may be a value obtained by adding a standard deviation of sample means within the measurement range to a mean of sample means within the measurement range. In addition, the replacement mean may be a mean value of sample mean values remaining after excluding the one or more outlier values from the sample mean values within the measurement window. In addition, the replacement standard deviation may be a mean of sample standard deviations remaining after excluding the sample standard deviation for the one or more outlier values from sample standard deviation values, and the sample standard deviation may be a standard deviation of magnitudes of CSI values measured at an identical time point in the plurality of subcarriers.

The measurement value may be a value processed by an offset removal filter. The offset removal filter may obtain a difference between input values measured close together in time among a plurality of input values within a measurement window representing a time interval during which measurement is performed, apply an outlier removal filter to the obtained difference, and output a value obtained by adding a first input value which is temporally most advanced in the measurement window and difference values obtained by applying an outlier removal filtering to the first input value. The outlier removal filter may replace an outlier value, which is a value outside a specific range among input values within the measurement window, with a replacement value. A minimum value in the specific range is a value obtained by subtracting a standard deviation of the input values within the measurement range from a mean of the input values within the measurement range. The maximum value in the specific range may be a value obtained by adding the standard deviation of input values within the measurement range to the mean of input values within the measurement range. The replacement value may be a mean value of input values remaining after excluding the outlier value from input values within the measurement window.

According to an embodiment of the disclosure, a method for operating a sensing device configured to perform movement detection by using a measurement value representing a channel state measured using a wireless LAN signal, the method including obtaining a standard deviation of magnitudes of the measurement values over a predetermined number of measurements or within a predetermined time interval, and obtain a feature value of a sensing algorithm, based on the obtained standard deviation value. The sensing algorithm is an algorithm learned based on a correlation between a value obtained based on the magnitudes of the measurement values and the presence or absence of movement around devices exchanging the wireless LAN signal.

The sensing algorithm may be an algorithm learned based on a correlation between a value obtained based on magnitudes of the measurement values and the strength of the wireless LAN signal and the presence or absence of movement around devices exchanging the wireless LAN signal.

The sensing algorithm may be a binary classification function with respect to motion detection. In this case, the method may further include outputting whether a final movement has been detected, based on whether the number of detection results indicating movement detection, among a plurality of detection results determined according to an output value of the sensing algorithm during the voting period, is equal to or greater than a predetermined number. The voting period is a time interval determined by the sensing device.

The outputting whether a final movement has been detected may further include adjusting the sensitivity of the movement detection by adjusting the length of the voting period.

The method may further include, as the measurement value, using only a measurement value of an antenna having the smallest mean value of the measurement values within a measurement window, when the wireless LAN signals are simultaneously exchanged through a plurality of antennas of one terminal, wherein the measurement window is a time interval during which measurement is performed.

The measurement value may be obtained based on a sample mean, which is a value obtained by averaging magnitudes of channel state information (CSI) values measured at an identical time point in a plurality of subcarriers transmitting the wireless LAN signal.

The measurement value may be a value filtered by a selective subcarrier shift removal filter. The selective subcarrier shift removal filter may apply Z-score normalization to samples corresponding to outlier values, which are values outside a specific range, among sample mean values within a measurement window representing a time interval during which measurement is performed, and apply inverse Z-score normalization to the Z-score normalized sample by using a replacement mean and a replacement standard deviation. The minimum value in the specific range may be a value obtained by subtracting a standard deviation of sample means within the measurement range from a mean of sample means within the measurement range, and the maximum value in the specific range may be a value obtained by adding a standard deviation of sample means within the measurement range to a mean of sample means within the measurement range. The replacement mean may be a mean value of sample mean values remaining after excluding the outlier value from the sample mean values within the measurement window. The replacement standard deviation may be a mean of sample standard deviations remaining after excluding the sample standard deviation for the outliers from sample standard deviation values, and the sample standard deviation may be a standard deviation of magnitudes of CSI values measured at an identical time point in the plurality of subcarriers.

The measurement value may be a value processed by an offset removal filter. The offset removal filter may obtain a difference between input values measured close together in time among a plurality of input values within a measurement window representing a time interval during which measurement is performed, apply an outlier removal filter to the obtained difference values, and output a value obtained by adding a first input value which is temporally most advanced in the measurement window and difference values obtained by applying an outlier removal filtering to the first input value. The outlier removal filter may replace an outlier value, which is a value outside a specific range among input values within the measurement window, with a replacement value. The minimum value in the specific range is a value obtained by subtracting a standard deviation of the input values within the measurement range from a mean of the input values within the measurement range. The maximum value in the specific range may be a value obtained by adding the standard deviation of input values within the measurement range to the mean of input values within the measurement range. The replacement value may be a mean value of input values remaining after excluding the outlier value from input values within the measurement window.

Advantageous Effects

An embodiment of the disclosure provides a method and device for detecting motion by using a wireless LAN signal.

MODE FOR CARRYING OUT THE INVENTION

Although the terms used herein are selected from currently widely used general terms while considering functions of the disclosure, the meanings of the terms may vary according to intention or customs of those skilled in the art or emergence of new technology. Some of the mentioned terms may have been selected by the applicant at his or her discretion, and in such cases the detailed meanings thereof will be described in relevant parts of the description herein. Thus, the terms used herein should be interpreted based on the substantial meanings of the terms and the whole content of this specification rather than simply a name of the term.

Throughout this specification, when it is described that an element is "coupled" to another element, the element may be "directly coupled" to the other element or "electrically coupled" to the other element with a third element interposed therebetween. Further, unless explicitly described to the contrary, when a certain component is said to "comprise" a specific component, this means that the component may further include additional components without excluding other components. Moreover, limitations such as "or more" or "or less" based on a specific threshold may be appropriately substituted with "more than" or "less than" according to embodiments, respectively.

Figure 1:
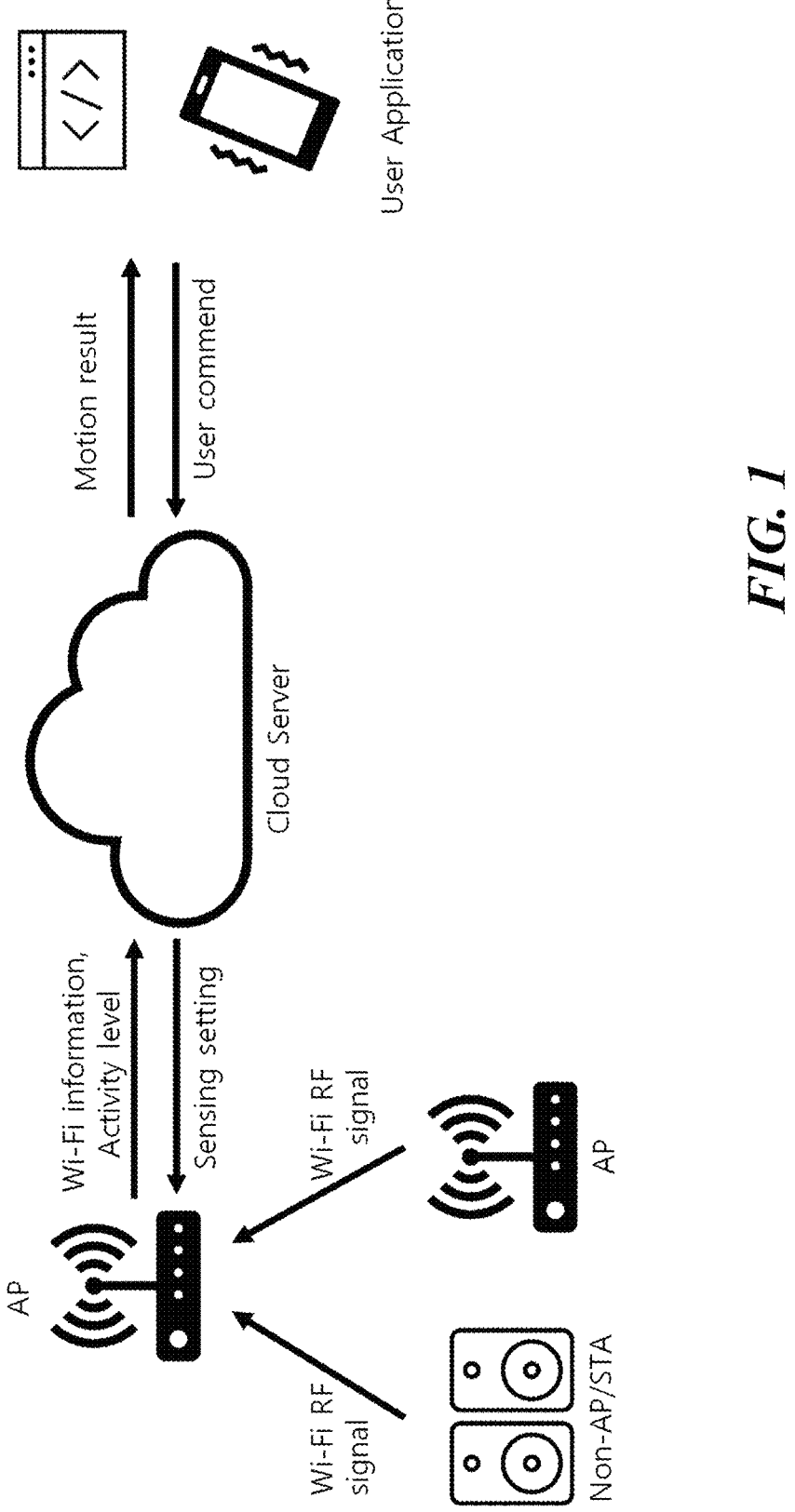
FIG. 1 illustrates a system for detecting a user's motion by using a wireless LAN signal according to an embodiment of the disclosure.

FIG. 1 illustrates a system for detecting a user's motion by using a wireless LAN signal according to an embodiment of the disclosure.

Various stations may associate with the AP. The AP may detect movement around the AP and the station, based on the information on the measurement results of RF signals transmitted from the station or measurement results of signals transmitted from the station. Specifically, when movement around APs and stations occurs, signal measurement results are changed. Accordingly, the AP may track the change in the signal measurement result of the station to detect movement around the AP and the station. In this case, the signal measurement result may be channel state information (CSI). In the specification, a station that performs signal measurement or transmits a signal used for signal measurement is referred to as a sensing node.

The AP calculates the degree of movement detected based on the received signal measurement result. In this case, the degree of movement is referred to as an activity level. The AP transmits the calculated activity level to a cloud server. In this case, the AP may transmit wireless LAN information related to signal measurement together. The wireless LAN information may include at least one of information on an RF signal used for signal measurement, information on a basic service set (BSS) operated by the AP, and information on a station coupled to the AP.

A user application may display information received from the cloud server according to a user's input. Specifically, the user application may display an activity level calculated from the signal measurement result received from a sensing node. The user application may be a mobile application or web application running on a smartphone.

The cloud server stores data received from the AP. In addition, the cloud server processes a user application request and transmits a response to the user application request. In addition, the cloud server may transmit a command with respect to the AP, having been transmitted by the user application, to the AP. A user may identify information on the station coupled to the AP, via the user application. In this case, the station information may include at least one of a station name and location.

FIG. 1 describes the AP as a device configured to detect a motion, based on a measurement result. However, in another specific embodiment, a cloud server may detect a motion, based on a measurement result. Henceforth, in the specification, a device that senses a motion, based on a measurement result is referred to as a sensing device.

Figure 2:
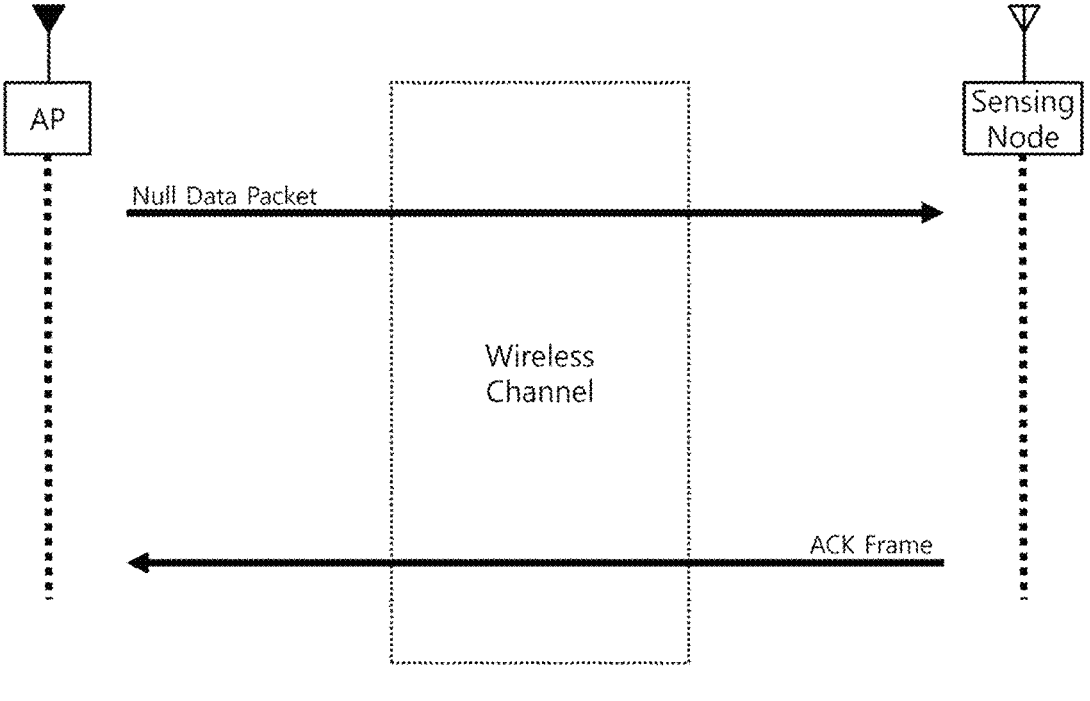
FIG. 2 illustrates an AP and a sensing node which perform frame exchange according to an embodiment of the disclosure.

FIG. 2 illustrates an AP and a sensing node which perform frame exchange according to an embodiment of the disclosure.

CSI may represent distortion of a signal while the signal is propagated from a transmitter to a receiver. In addition, the CSI may indicate effects of power attenuation according to scattering, fading, distance, and the like. The transceiver may respond to a change in a channel state, based on channel state information (CSI). Through this, the transceiver may maintain high reliability in communication using a plurality of antennas with a high data rate. Since the CSI may indicate distortion of a signal being propagated from a transmitter to a receiver, the CSI needs to be measured at the receiver side. A measurement procedure needs to be performed continuously and at appropriate times. Therefore, it may be recommended to perform the measurement procedure by using a device which is powered by a source, rather than a battery.

In FIG. 2, the AP transmits a null data packet from the sensing node, and the sensing node transmits an ACK frame to the AP. The AP measures CSI with respect to a signal including an ACK frame. Through this, the AP may minimize the influence on power consumption of a battery of the sensing node. In addition, the CSI measured by the AP may indicate the current state of a wireless channel. The state of the wireless channel indicates signal propagation distortion while the ACK frame transmitted by the sensing node to the AP is propagated wirelessly.

Figure 3:
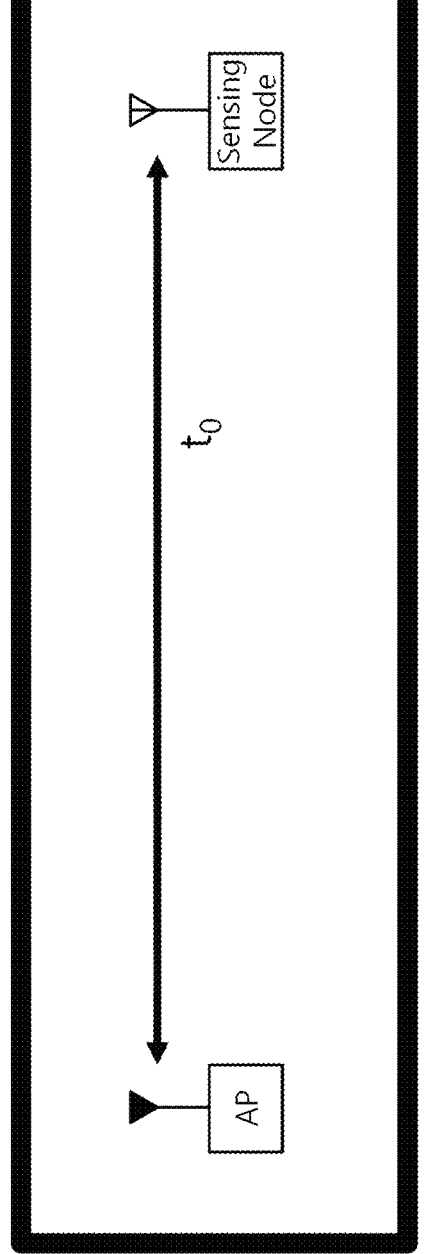
FIG. 3 illustrates a channel state change occurring due to various events, in a wireless channel in which an AP and a sensing node exchange signals according to an embodiment of the disclosure.
Figure 3:
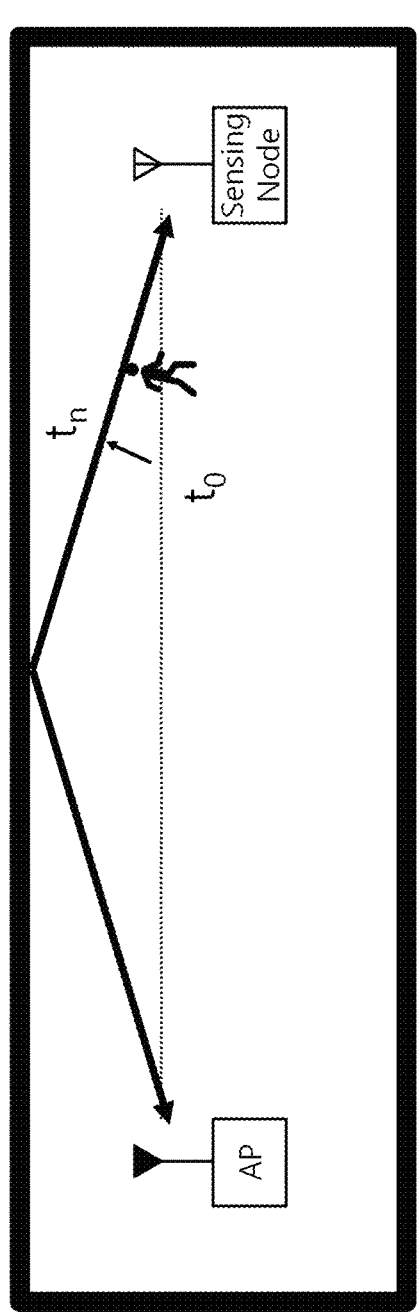

FIG. 3 illustrates a channel state change occurring due to various events, in a wireless channel in which an AP and a sensing node exchange signals according to an embodiment of the disclosure.

When no obstacle is present between the AP and the sensing node, the AP and the sensing node may exchange signals via an optimal path. The optimal path between the AP and the sensing node may be hindered by a person's movement. This may cause both the AP and the sensing node to modify the path of the signal.

In FIG. 3, signal exchange between the AP and the sensing node is performed via multiple paths. In this case, the received signal is expressed as the sum of all signals having reached the receiver via the multiple paths. When no obstacle is present between the AP and the sensing node, the signal propagated through a line-of-sight path ($t_0$) generally has the greatest effect. When an obstacle, for example, a person, passes by the optimal path ($t_0$) between the AP and the sensing node, a signal propagated via a path ($t_n$) other than the line-of-sight path between the AP and the sensing node may have the greatest effect on the received signal. Therefore, when there is no change in the environment around the AP and the sensing node, the value of CSI may be stable. In addition, when there is a change in the environment around the AP and the sensing node, the deviation of the CSI with respect to the received signal formed by the sum of multiple paths may increase.

Figure 4:
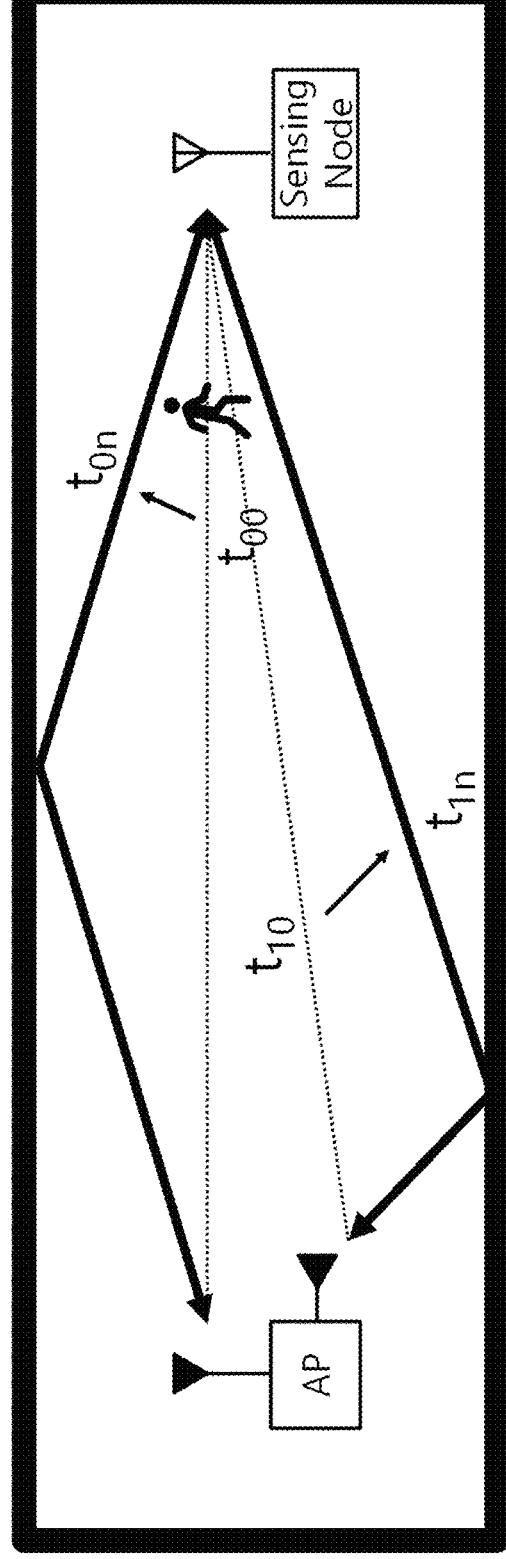
FIG. 4 illustrates a channel state change occurring due to various events, in a channel in which an AP having a plurality of antennas and a sensing node exchange signals according to an embodiment of the disclosure.

FIG. 4 illustrates a channel state change occurring due to various events, in a channel in which an AP having a plurality of antennas and a sensing node exchange signals according to an embodiment of the disclosure.

When an AP and a sensing node exchange signals through a plurality of antennas, multiple measured CSI values are obtained because multiple paths through which signals are exchanged are provided. Therefore, when the AP and the sensing node exchange signals through a plurality of antennas and a plurality of CSI values are used, changes in the environment around the AP and the sensing node may be more accurately detected than when signals are exchanged through a single antenna. In addition, when the AP and the sensing node exchange signals through a plurality of antennas and a plurality of CSI values are used, the sensing coverage may be wider than when signals are exchanged through a single antenna.

In FIG. 4, when there is no obstacle between a sensing node and an AP having two antennas, a signal having been exchanged through a propagation path ($t_{00}$-$t_{10}$) may have the greatest effect. When an obstacle, for example, a person, passes by the propagation path between the AP and the sensing node ($t_{00}$-$t_{10}$), a change occurs in a radio signal propagation path (path ($t_{0n}$-$t_{1n}$)) and the CSI of the received signal changes. In this case, the AP obtains a plurality of CSI values according to the number of receiving antennas.

As described with reference to FIGS. 3 to 4, a person's movement may be detected based on a change in a CSI value. However, not only a person's movement but also various environmental changes around the AP and the sensing node may cause a change in the CSI value. Therefore, environmental changes rather than a person's movement need to be excluded. In the case of environmental changes rather than a person's movement, a rapid change in the CSI value may occur. Therefore, a method for excluding a sudden change in the CSI value is required. In addition, when a change having a feature different from that of a change in the CSI value caused by a person's movement is removed, false sensing caused by animal or object's movement may be prevented. Embodiments for this will be described through FIGS. 5 to 13.

In addition, although CSI has been given as an example in the previous description, the sensing device according to an embodiment of the disclosure may perform motion detection by using another value indicating a channel state instead of the CSI. For convenience of description, a mea-surement value representing a channel state is referred to as a measurement value or a measurement result.

Figure 5:
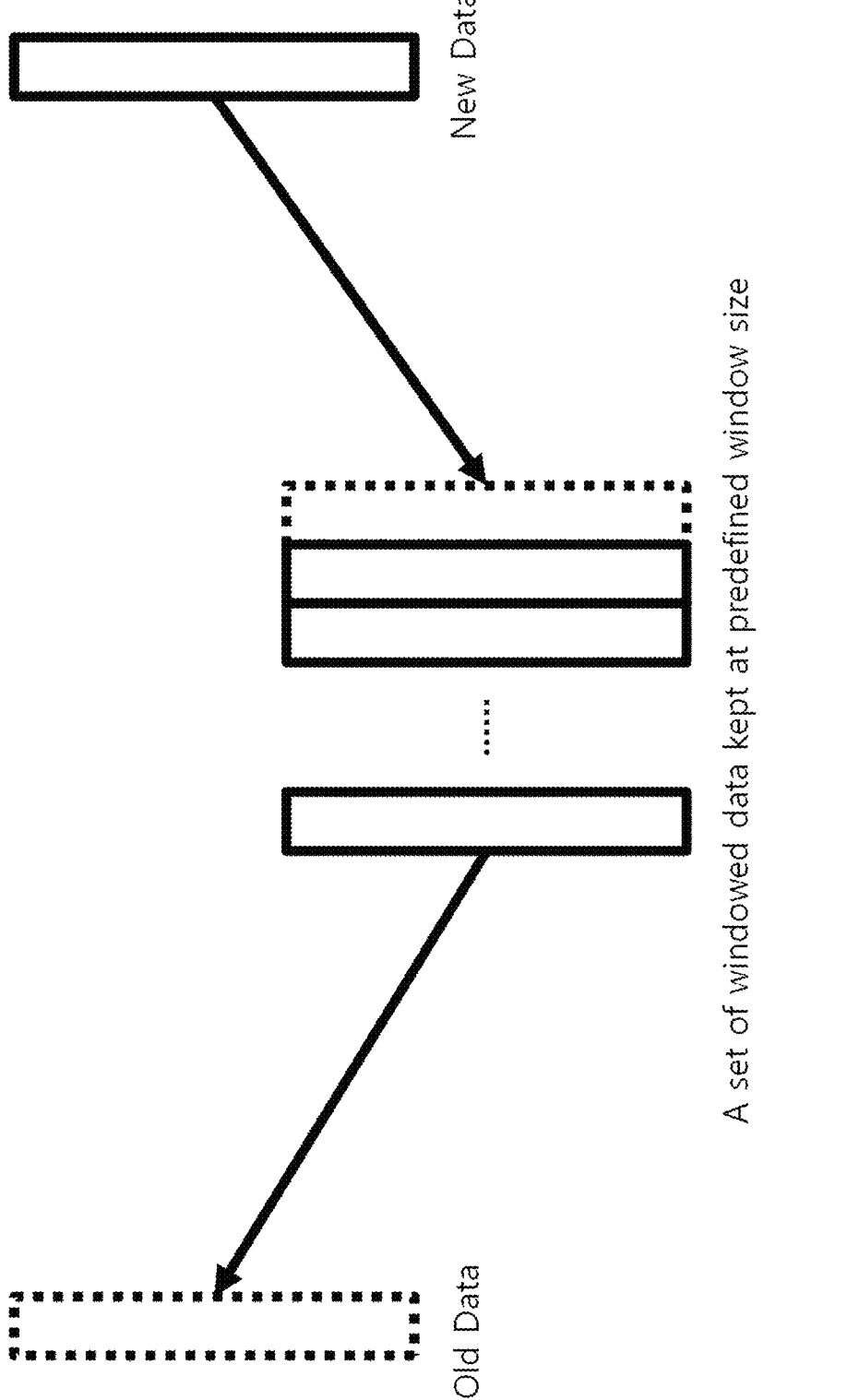
FIG. 5 shows that a sensing device according to the embodiment of the disclosure uses, as a feature value of a sensing algorithm, a value obtained based on the sum of a plurality of measurement values measured immediately before the latest measurement value.

FIG. 5 shows that a sensing device according to the embodiment of the disclosure uses, as a feature value of a sensing algorithm, a value obtained based on the sum of a plurality of measurement values measured immediately before the latest measurement value.

In general, noise may temporarily affect and then disap-pear. Accordingly, the sensing device may use, as a feature value of a sensing algorithm, a value obtained based on the mean value of a latest measurement value and the measure-ment value measured before the latest measurement value. Specifically, the sensing device may use, as a feature value of the sensing algorithm, a value obtained based on the sum of N−1 measurement values measured immediately before a latest measurement value and the latest measurement value. Here, N is a natural number greater than 1. A value obtained based on the sum of N−1 measurement values and the latest measurement value may be the mean of the N−1 measure-ment values and the latest measurement value. In addition, the sensing device may obtain a measurement value by measuring a channel state at regular time intervals. For convenience of description, a time interval during which N measurement values are obtained is referred to as a mea-surement window. In addition, N may be a predetermined value or may be adjusted by the sensing device. Through the embodiments, the sensing device may remove noise that causes a temporary change in measurement value.

Figure 6:
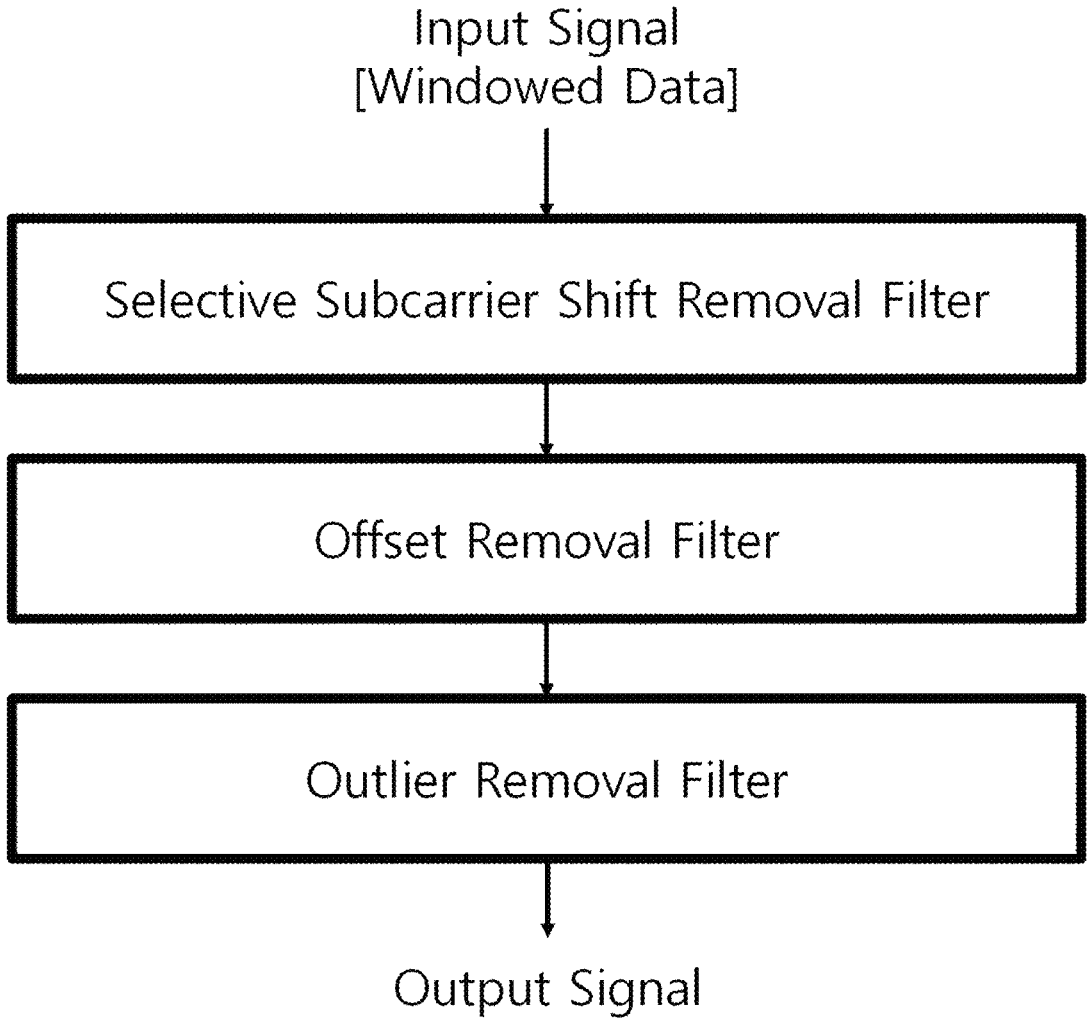
FIG. 6 shows a method for removing noise generated when a channel state is measured according to an embodiment of the disclosure.

FIG. 6 shows a method for removing noise generated when a channel state is measured according to an embodi-ment of the disclosure.

When a channel state is measured, various noises, such as spike noise or step noise, may occur. Spike noise is also referred to as impulse noise. Spike noise may be determined by the appearance of sharp and sudden disturbances. Spike noise occurs for a relatively short period of time. Step noise may be determined by the appearance of sharp and sudden disturbances like impulse noise. However, step noise occurs for a relatively long time. A wireless LAN signal is per-formed using a plurality of subcarriers. Therefore, noise may occur for each subcarrier. To offset noise affecting each subcarrier, the sensing device may apply a noise reduction filter to each subcarrier. In addition, specific noise may occur in all subcarriers. To reduce this kind of noise, the sensing device may apply a noise reduction filter to a plurality of subcarriers.

The sensing device may apply a subcarrier shift removal filter to a measurement value. In addition, the sensing device may apply an offset removal filter to the measurement value. In addition, the sensing device may apply an outlier removal filter to the measurement value.

FIG. 6 shows an operation in which the sensing device applies a subcarrier shift removal filter, an offset removal filter, and an outlier removal filter to a measurement value. A detailed operation of applying the subcarrier shift removal filter, the offset removal filter, and the outlier removal filter will be described with reference to FIGS. 7 to 9, respec-tively.

Figure 7:
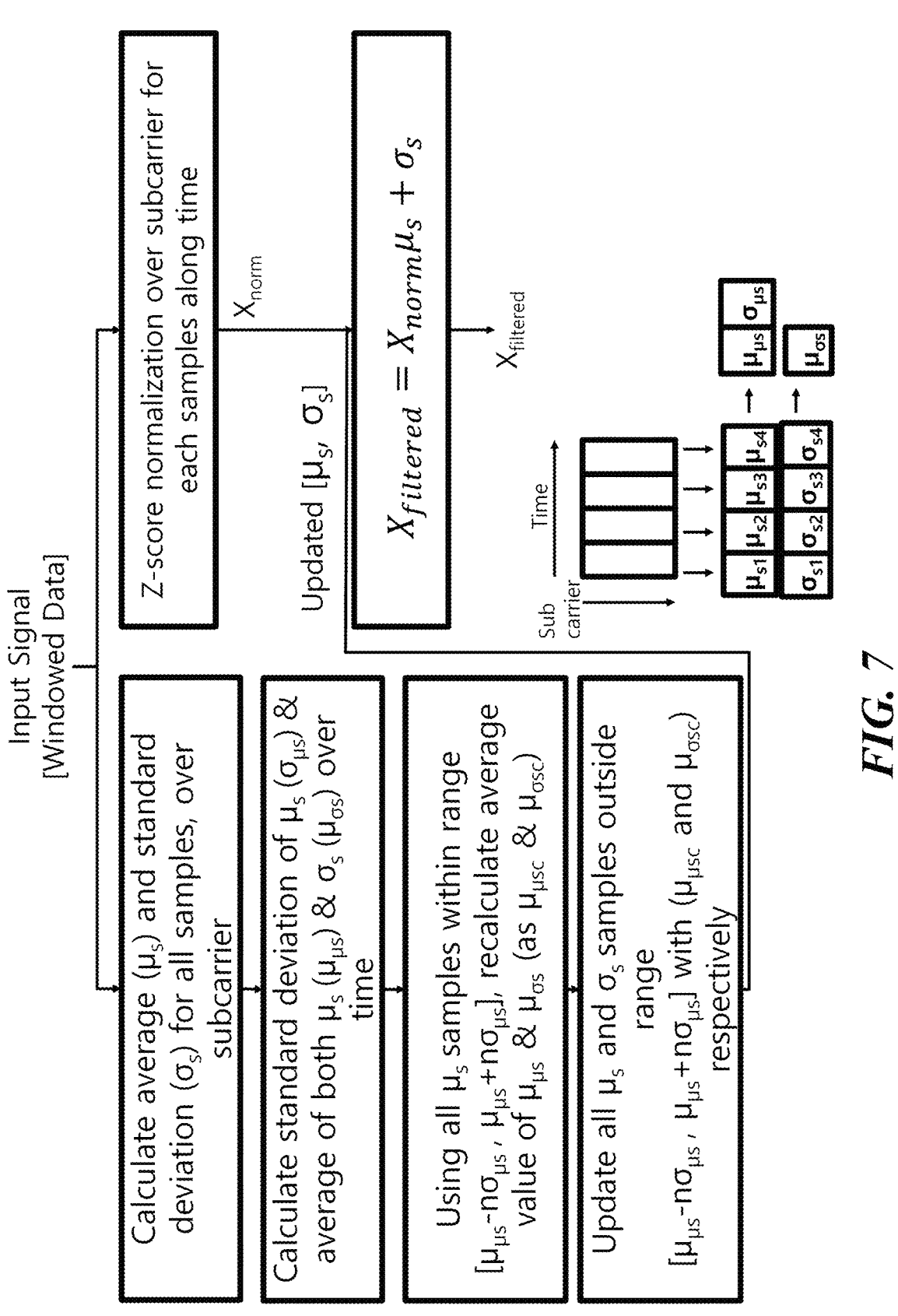
FIG. 7 shows an operation in which a subcarrier shift removal filter is applied to a measurement value by a sensing device according to an embodiment of the disclosure.

FIG. 7 shows an operation in which a subcarrier shift removal filter is applied to a measurement value by a sensing device according to an embodiment of the disclosure.

The sensing device may use, as a feature value of the sensing algorithm, a value obtained based on the mean and standard deviation of measurement values for each subcar-rier, measured at the same time. Specifically, the sensing device obtains the mean and standard deviation of measure-ment values for each subcarrier measured at the same time.

For convenience of description, the measurement result for each subcarrier, measured at the same time, is referred to as a sample, and the mean and standard deviation of the measurement values for each subcarrier, measured at the same time, are referred to as sample mean and sample standard deviation.

The sensing device may remove a sample having a sample mean value that is significantly different from other sample mean values within the measurement window. Specifically, the sensing device may remove a sample having sample mean outside a specific range, among samples within the measurement window, and may use a value obtained based on the remaining values as a feature value of the sensing algorithm. Specifically, the sensing device may replace the sample mean ($\mu_{s2}$) of sample outside a specific range, among sample means, with replacement mean. In this case, the replacement mean may be the mean ($\mu_{\mu s}$) of the sample mean values remaining after excluding values outside a specific range among sample mean values within the measurement window. In addition, the minimum value in the specific range is a value obtained by subtracting the standard deviation ($\sigma_{\mu s}$) of sample means within the measurement window from the mean ($\mu_{\mu s}$) of sample means within the measurement window, and the maximum value in the specific range may be a value obtained by adding the standard deviation ($\sigma_{\mu s}$) of sample means within the measurement window to the mean ($\mu_{\mu s}$) of sample means within the measurement window. Sample standard deviation ($\sigma_{s2}$) including sample mean outside the specified range may also be replaced with a replacement standard deviation. In this case, the replacement standard deviation may be the mean ($\mu_{\sigma s}$) of the sample standard deviation values remaining after excluding sample standard deviation values of samples including sample mean outside the specific range, among sample standard deviation values within the measurement window.

The sensing device may perform Z-score normalization on the measurement window samples, that is, may make the mean and standard deviation of the measurement window samples 0 and 1, respectively. Thereafter, the Z-score normalized data may be restored to an original signal via inverse Z-score normalization. In this case, when the sensing device restores samples having sample mean values outside the specific range, the sensing device may apply the inverse Z-score normalization ($X_{filtered} = X_{norm}\mu_{\mu s} + \mu_{\sigma s}$) by using the mean ($\mu_{\mu s}$) of the newly calculated sample mean instead of the sample mean of the sample and the mean ($\mu_{\sigma s}$) of the sample standard deviation value instead of the sample standard deviation of the sample. In addition, the sensing device may omit Z-score normalization for the samples having the sample mean within a specific range.

FIG. 7 is a flowchart illustrating the above-described operation. Through the embodiments, the subcarrier shift removal filter of the sensing device may remove noise affecting overall subcarriers used for wireless LAN signal transmission. Particularly, through the embodiments, the sensing device may remove the above-mentioned spike noise.

Figure 8:
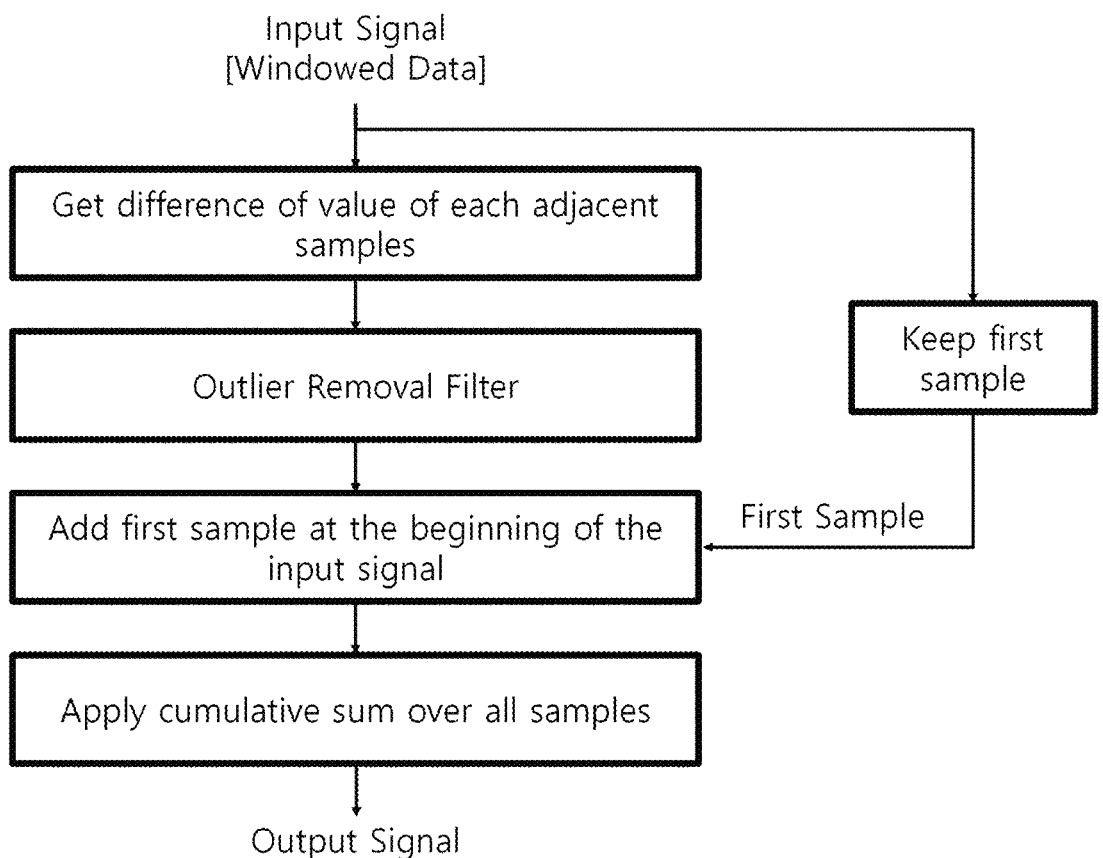
FIG. 8 shows that an offset removal filter is applied to a measurement value by a sensing device according to an embodiment of the disclosure.

FIG. 8 shows that an offset removal filter is applied to a measurement value by a sensing device according to an embodiment of the disclosure.

In addition, the sensing device may obtain a difference between measurement values of adjacent samples within the measurement window, and apply an outlier removal filter to the obtained difference values. The sensing device may use, as a feature value of the sensing algorithm, a value obtained based on the filtered difference values. In this case, the measurement value of the sample may be the sample mean and sample standard deviation having undergone filtering through the operation in FIG. 7 above. In addition, the measurement value of the sample may be the sample mean and sample standard deviation having not undergone filtering of FIG. 7. Specifically, the sensing device may obtain a difference between measurement values of adjacent samples within the measurement window. In this case, the sensing device may apply an outlier removal filter to the obtained difference values. The outlier removal filter is a filter for flattening a value of the sample outside the specific range among a plurality of values. The outlier removal filter will be described in detail with reference to FIG. 9. The sensing device may enable restoration in the form of a measurement value within the measurement window by adding a measurement value of a first sample within the measurement window and difference values obtained through the outlier removal filtering of the measurement value of the first sample. In this case, the first sample is a sample measured first within the measurement window. FIG. 8 shows the above-mentioned operation by the sensing device.

Figure 9:
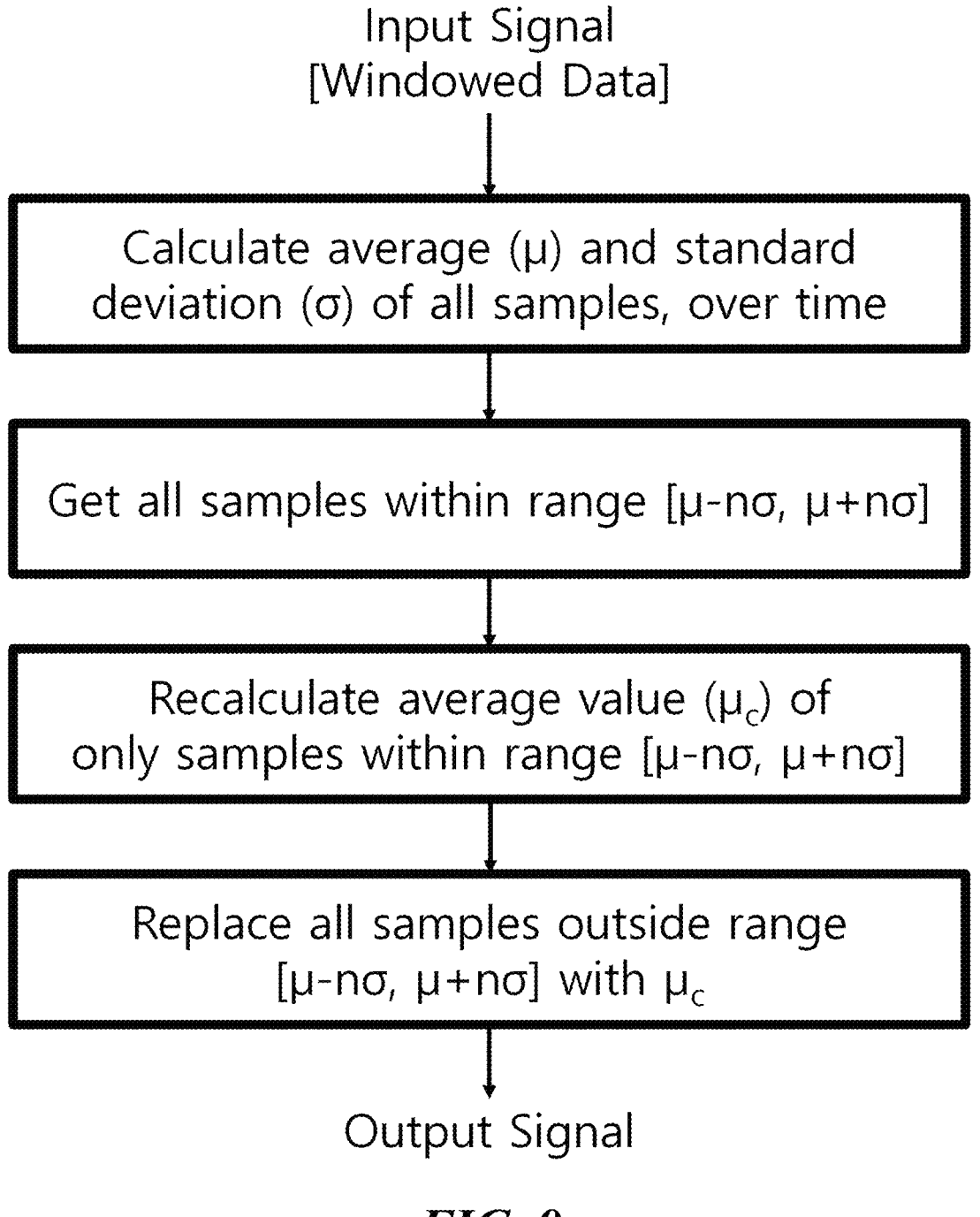
FIG. 9 shows an operation in which outlier filtering is performed by a sensing device according to an embodiment of the disclosure.

FIG. 9 shows an operation in which outlier filtering is performed by a sensing device according to an embodiment of the disclosure.

The outlier removal filter represents obtaining the mean by using only the values remaining after excluding an outlier value that is a value out of a normal range among a plurality of values, and then replacing the outlier value with a mean value. In this case, the minimum value in the normal range is a value obtained by subtracting the standard deviation of the plurality of values from the mean of the plurality of values, and the maximum value in the normal range is a value obtained by adding the standard deviation of the plurality of values to the mean of the plurality of values. Through this, a value outside the average range, among the plurality of values, may be removed.

Figure 10:
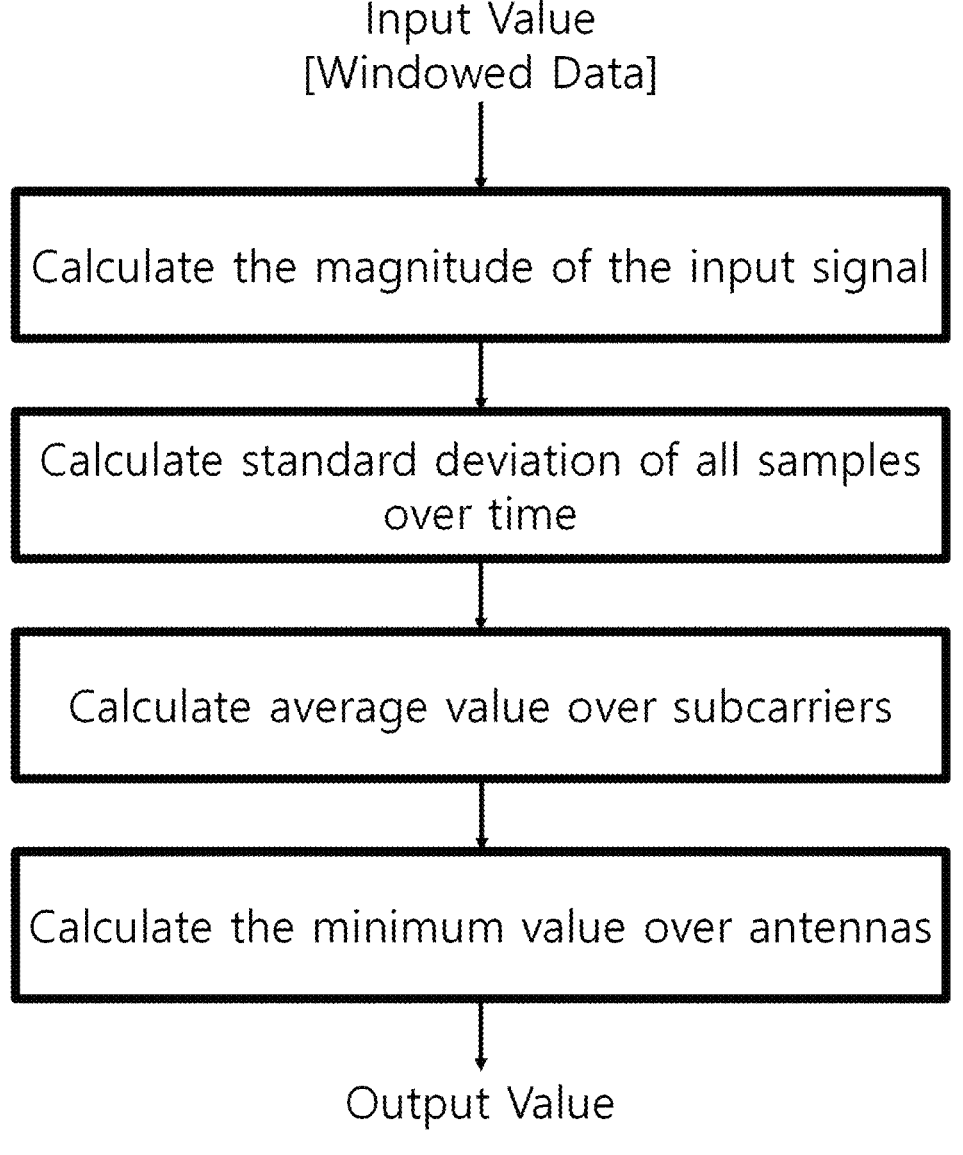
FIG. 10 shows a method for extracting, by a sensing device, a feature value of a sensing algorithm from a measurement value according to an embodiment of the disclosure.

FIG. 10 shows a method for extracting, by a sensing device, a feature value of a sensing algorithm from a measurement value according to an embodiment of the disclosure.

A CSI value is a value representing deviation with respect to the reference signal. The CSI value is extracted as a complex number. The sensing device may obtain a feature value of the sensing algorithm, based on the magnitude of the CSI value. The sensing device may obtain the standard deviation of the magnitude of the CSI value over a predetermined number of measurements or within a predetermined time interval, and obtain a feature value of the sensing algorithm, based on the obtained standard deviation value. The measurement value used in FIGS. 5 to 9 above may be a standard deviation value of the magnitude of the CSI value over a predetermined number of measurements or within a predetermined time interval. This is because the movement of the surroundings of the AP and the sensing node affects the change in the propagation path to cause a change in the CSI value.

In this case, the sensing device may obtain the standard deviation of the magnitude of the CSI value over a predetermined number of measurements or within a predetermined time interval for each subcarrier. Thereafter, the sensing device may obtain the mean of the standard deviation of magnitudes of CSI values of all subcarriers. This is because the magnitude of CSI may be different for each subcarrier. In addition, when the AP includes a plurality of antennas, the sensing device may use, as a feature value of the sensing algorithm, the smallest value among the means of the standard deviations of magnitudes of CSI values of all subcarriers for each antenna. This is because each antenna may indicate a different path. This is because the smallest value among the means of the standard deviations of the magnitudes of the CSI values of all subcarriers for each antenna may be regarded as a value least affected by changes in the CSI values, caused by various noises. Although referred to as a CSI value in the previous description, the CSI value may be a CSI value to which the preprocessing described with reference to FIGS. 5 to 9 is applied or a measurement value to which the preprocessing is applied.

The change in the CSI value may reflect signal attenuation as well as a change in path through which a signal is transmitted. Therefore, as the sensing node moves away from the AP, the change in the CIS value decreases even when movement is present between the sensing node and the AP. Therefore, a method for normalizing the level of a measurement value is required. This will be described with reference to FIGS. 11 and 12.

Figure 11:
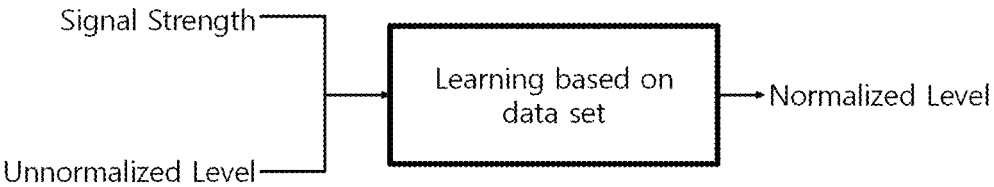
FIG. 11 shows an operation in which a measurement value is normalized by a sensing device according to an embodiment of the disclosure.

FIG. 11 shows an operation in which a measurement value is normalized by a sensing device according to an embodiment of the disclosure.

A threshold value may be applied to a feature value of an algorithm to determine whether movement is in progress around the AP and the sensing node. For example, movement may be determined based on whether a feature value of the algorithm is greater than a threshold value. Since the feature value of the algorithm described with reference to FIG. 10 is based on the standard deviation of a CSI value, the feature value of the algorithm may not include units or ranges and may vary depending on the distance between the AP and the sensing node. In general, as the distance between the AP and the station increases, the signal strength (RSSI, received signal strength indication) has a lower value. In this case, collected data, in which signal strength and the level of an unnormalized measurement value are an input value and determination of whether movement is in progress around the AP and the sensing node is a result value, may be used. For convenience of description, the feature value of the algorithm is referred to as activity, and the determination of whether movement is in progress around the AP and the sensing node is referred to as a movement detection result. The sensing device may use an algorithm for normalizing the level of activity value which do not have units and ranges. In this case, the algorithm may be an algorithm learned using a data set which has signal strength and unnormalized activity as an input value by using machine learning or regression algorithm and has determination of whether movement is in progress around the AP and sensing node as a result value. Through this, the correlation between the signal strength and the level of the measurement value and the movement detection result may be learned, rather than simply the correlation between the level of the activity value and the motion detection result. In addition, it is preferrable that the data set used in learning cover the strength of possible signal and various operations.

In addition, the sensing algorithm may be a binary classification machine learning algorithm. Specifically, the sensing algorithm may use, as an activation function or a cost function, a sigmoid function which outputs a value of 0 to 1. In this case, the sigmoid function represents a probability of corresponding to a predetermined state. For example, in case that learning data is labeled as 1 when movement is detected, the learning data may be labeled as 0 when no movement is detected. In this case, a case in which an output of the sigmoid function is close to 1 indicates that the sensing algorithm has determined that there is a high probability that movement has occurred. In addition, a case in which an output of the sigmoid function is close to 1 indicates that the sensing algorithm does not determine that there is a high probability that there is no movement. The output of the sigmoid function has a value of 0 to 1 even when the signal strength (RSSI) varies, and therefore, the sensing device may easily adjust the sensitivity of movement detection when using the sigmoid function.

Figure 12:
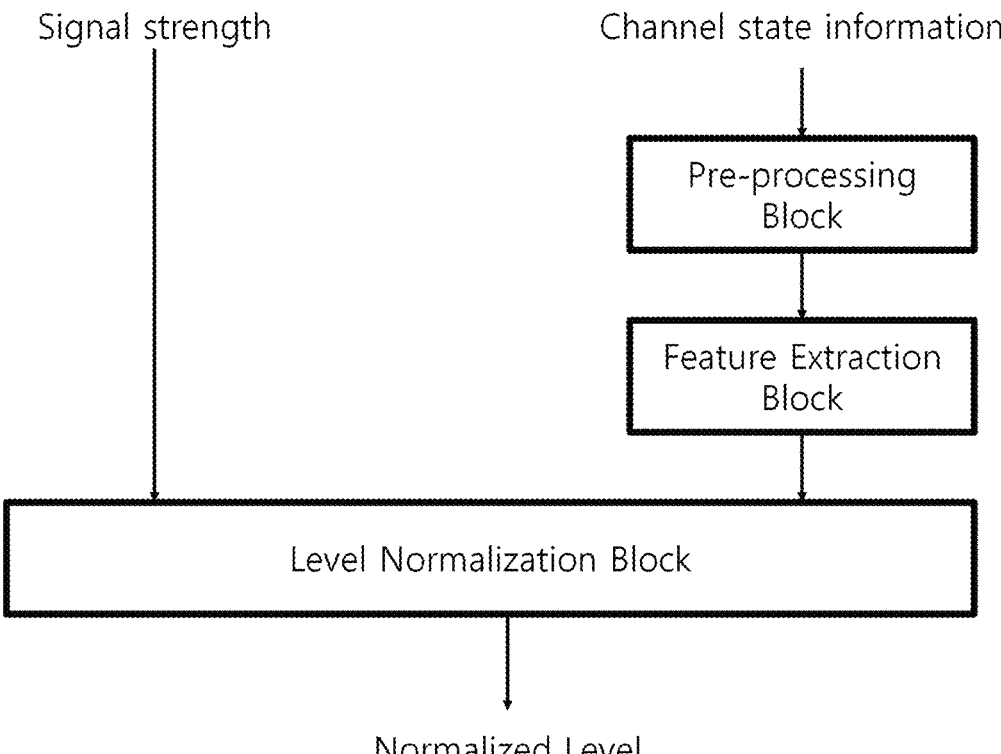
FIG. 12 shows an operation in which a sensing device according to an embodiment of the disclosure outputs a normalized level according to the method described with reference to FIGS. 5 to 11.

FIG. 12 shows an operation in which a sensing device according to an embodiment of the disclosure outputs a normalized level according to the method described with reference to FIGS. 5 to 11.

A preprocessing block of the sensing device may apply preprocessing for a measurement value obtained by measuring a channel state according to the embodiments described with reference to FIGS. 5 to 9. In this case, the preprocessing sequence may be changed from the above-described embodiments, and additional preprocessing may be performed. In addition, a feature value extraction block of the sensing device may extract a feature value (activity) from the preprocessed measurement value according to the embodiments described with reference to FIG. 10. In addition, a level normalization block of the sensing device may output an output value having a normalized level by using the sensing algorithm according to the embodiments described with reference to FIG. 11. The output value has a normalized range with respect to the same movement, regardless of the distance (RSSI) between the AP and the sensing node. In this case, the input value of the sensing algorithm may indicate activity and signal strength, as described above.

Figure 13:
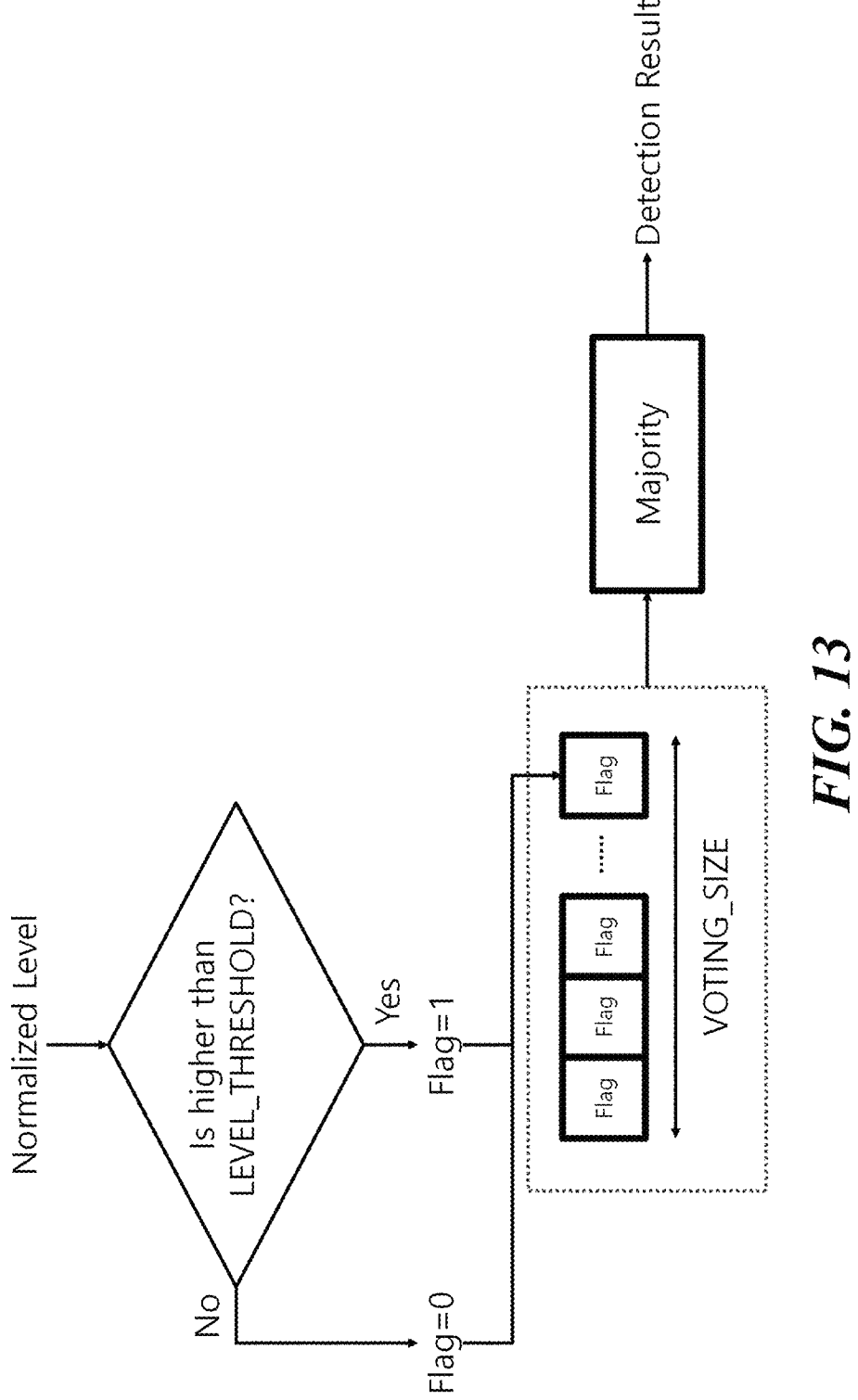
FIG. 13 shows an operation in which a sensing device according to an embodiment of the disclosure monitors an output value of a sensing algorithm for a predetermined time interval to output a final detection result.

FIG. 13 shows an operation in which a sensing device according to an embodiment of the disclosure monitors an output value of a sensing algorithm for a predetermined time interval to output a final detection result.

According to the above-described embodiments, an output value of the sensing algorithm may be normalized. When the output value is normalized, constant sensitivity may be maintained even when the sensing node is changed. In addition, the sensing device may determine movement, based on whether an output value of the sensing algorithm is greater than a threshold value. In this case, the sensing device may adjust the sensitivity of movement detection by adjusting the magnitude of the threshold value. For example, the sensing device may reduce erroneous detection by increasing a threshold magnitude. In addition, the sensing device may increase sensitivity of movement detection by lowering the threshold magnitude. In the following description, a result determined by comparing an output value of the sensing algorithm with a threshold value is referred to as a detection result, and a detection result finally output by the sensing device is referred to as a final result.

In addition, a final detection result may be output by monitoring detection results for a predetermined period. In this case, the predetermined period may be referred to as a voting period, and the length of the voting period may be referred to as a voting size. Specifically, when a plurality of detection results output over a predetermined period of time exceed a predetermined number and then are output as motion detection, the sensing device may set a final output as motion detection. When a plurality of detection results output over a predetermined period of time are less than or equal to a predetermined number and are output as motion detection, the sensing device may set a final output as motion detection. In this case, the predetermined number may be half of the number of detection results determined over a predetermined period of time. In addition, the voting size may be adjusted by the sensing device. The sensing device may adjust the sensitivity of movement detection by adjusting the voting size. For example, the sensing device may increase the sensitivity of movement detection by reducing the voting size. However, the sensing device may reduce the probability of erroneous detection by increasing the voting size. Through this embodiment, the sensing device may reduce erroneous detection due to noise.

As described above, the disclosure has been described by taking wireless LAN communication as an example, but the disclosure is not limited thereto and may be equally applied to other communication systems such as cellular communication. In addition, although the method, device, and system of the disclosure have been described with reference to specific embodiments, some or all of the components and operations of the disclosure may be implemented using a computer system having a general-purpose hardware architecture.

Features, structures, effects, etc. described in the embodiments above are included in at least one embodiment of the disclosure and are not necessarily limited to only one embodiment. Furthermore, the features, structures, effects, etc. illustrated in each embodiment may be combined or modified with respect to other embodiments by a person having ordinary knowledge in the field to which the embodiments belong. Therefore, contents related to these combinations and variations should be construed as being included in the scope of the disclosure.

Although the above has been described with reference to the embodiments, these are only examples and do not limit the disclosure, and it should be understood by ordinary skill in the art to which this disclosure belongs that various variations and applications not exemplified above may be made without departing from the essential characteristics of the disclosure. For example, each component specifically shown in the embodiment may be modified and implemented. In addition, differences related to these modifications and applications should be construed as being included in the scope of the disclosure as defined in the appended claims.

The invention claimed is:

1. A sensing device configured to perform movement detection by using a measurement value representing a channel state measured using a wireless LAN signal, the sensing device comprising:

a memory; and a processor, wherein the processor is configured to:

obtain a standard deviation of magnitudes of measurement values within a measurement window, wherein the measurement window is a time interval during which measurement is performed; and obtain a result of a movement detection of a sensing algorithm which is based on the obtained standard deviation value, and wherein the processor is further configured to use, as the measurement values, only a measurement value of an antenna having a smallest mean value of standard deviation of the measurement values within the measurement window, when the wireless LAN signal is simultaneously exchanged through a plurality of antennas of one terminal, and wherein the sensing algorithm is an algorithm learned based on a correlation between a value obtained based on the magnitudes of the measurement values and a presence or absence of movement around devices exchanging the wireless LAN signal.

2. The sensing device of claim 1, wherein the sensing algorithm is an algorithm learned based on a correlation between a value obtained based on the magnitudes of the measurement values and a strength of the wireless LAN signal and the presence or absence of movement around devices exchanging the wireless LAN signal.

3. The sensing device of claim 1, wherein the sensing algorithm is a binary classification function with respect to the movement detection, the processor is configured to output whether a movement has been finally detected, based on whether a number of detection results indicating movement detection, among a plurality of detection results determined according to an output value of the sensing algorithm during a voting period, is equal to or greater than a predetermined number, and the voting period is a time interval determined by the sensing device.

4. The sensing device of claim 3, wherein the processor is configured to adjust a sensitivity of the movement detection by adjusting a length of the voting period.

5. The sensing device of claim 1, wherein the measurement value is obtained based on a sample mean, which is a value obtained by averaging magnitudes of channel state information (CSI) values measured at an identical time point in a plurality of subcarriers transmitting the wireless LAN signal.

6. The sensing device of claim 5, wherein the measurement value is a value filtered by a selective subcarrier shift removal filter, the selective subcarrier shift removal filter is configured to apply Z-score normalization to samples corresponding to one or more outlier values, which are values outside a specific range, among sample mean values within the measurement window representing a time interval during which measurement is performed, and apply inverse Z-score normalization to the Z-score normalized sample by using a replacement mean and a replacement standard deviation, a minimum value in the specific range is a value obtained by subtracting a standard deviation of sample means within the specific range from a mean of sample means within the specific range, and a maximum value in the specific range is a value obtained by adding a standard deviation of sample means within the specific range to a mean of sample means within the specific range, the replacement mean is a mean value of sample mean values remaining after excluding the one or more outlier values from the sample mean values within the measurement window, the replacement standard deviation is a mean of sample standard deviations remaining after excluding the sample standard deviation for the one or more outlier values from sample standard deviation values, and the sample standard deviation is a standard deviation of magnitudes of CSI values measured at an identical time point in the plurality of subcarriers.

7. The sensing device of claim 1, wherein the measurement value is a value processed by an offset removal filter, the offset removal filter is configured to obtain a difference between input values measured close together in time among a plurality of input values within the measurement window, apply an outlier removal filter to the obtained difference, and output a value obtained by adding a first input value which is temporally most advanced in the measurement window and difference values obtained by applying an outlier removal filtering to the first input value, the outlier removal filter is configured to replace an outlier value, which is a value outside a specific range among input values within the measurement window, with a replacement value, a minimum value in the specific range is a value obtained by subtracting a standard deviation of the input values within the specific range from a mean of the input values within the specific range, and the maximum value in the specific range is a value obtained by adding the standard deviation of input values within the specific range to the mean of input values within the specific range, and the replacement value is a mean value of input values remaining after excluding the outlier value from input values within the measurement window.

8. A method for operating a sensing device configured to perform movement detection by using a measurement value representing a channel state measured using a wireless LAN signal, the method comprising:

obtaining a standard deviation of magnitudes of measurement values within a measurement window, wherein the measurement window is a time interval during which measurement is performed; and obtaining a result of a movement detection of a sensing algorithm; which is based on the obtained standard deviation value, wherein the obtaining the movement detection of the sensing algorithm comprises using, as the measurement value, only a measurement value of an antenna having a smallest mean value of standard deviation of the measurement values within the measurement window, when the wireless LAN signal is simultaneously exchanged through a plurality of antennas of one terminal, wherein the sensing algorithm is an algorithm learned based on a correlation between a value obtained based on the magnitudes of the measurement values and a presence or absence of movement around devices exchanging the wireless LAN signal.

9. The method of claim 8, wherein the sensing algorithm is an algorithm learned based on a correlation between a value obtained based on the magnitudes of the measurement values and a strength of the wireless LAN signal and the presence or absence of movement around devices exchanging the wireless LAN signal.

10. The method of claim 8, wherein the sensing algorithm is a binary classification function with respect to the movement detection, the method further comprises outputting whether a movement has been finally detected, based on whether a number of detection results indicating movement detection, among a plurality of detection results determined according to an output value of the sensing algorithm during a voting period, is equal to or greater than a predetermined number, and the voting period is a time interval determined by the sensing device.

11. The method of claim 10, wherein the outputting whether a final movement has been finally detected comprises adjusting a sensitivity of the movement detection by adjusting a length of the voting period.

12. The method of claim 8, wherein the measurement value is obtained based on a sample mean, which is a value obtained by averaging magnitudes of channel state information (CSI) values measured at an identical time point in a plurality of subcarriers transmitting the wireless LAN signal.

13. The method of claim 12, wherein the measurement value is a value filtered by a selective subcarrier shift removal filter, the selective subcarrier shift removal filter is configured to apply Z-score normalization to samples corresponding to one or more outlier values, which are values outside a specific range, among sample mean values within the measurement window, and apply inverse Z-score normalization to the Z-score normalized sample by using a replacement mean and a replacement standard deviation, a minimum value in the specific range is a value obtained by subtracting a standard deviation of sample means within the specific range from a mean of sample means within the specific range, and a maximum value in the specific range is a value obtained by adding a standard deviation of sample means within the specific range to a mean of sample means within the specific range, the replacement mean is a mean value of sample mean values remaining after excluding the one or more outlier values from the sample mean values within the measurement window, the replacement standard deviation is a mean of sample standard deviations remaining after excluding the sample standard deviation for the one or more outlier values from sample standard deviation values, and the sample standard deviation is a standard deviation of magnitudes of CSI values measured at an identical time point in the plurality of subcarriers.

14. The method of claim 8, wherein the measurement value is a value processed by an offset removal filter, the offset removal filter is configured to obtain a difference between input values measured close together in time among a plurality of input values within a measurement window representing a time interval during which measurement is performed, apply an outlier removal filter to the obtained difference, and output a value obtained by adding a first input value which is temporally most advanced in the measurement window and difference values obtained by applying an outlier removal filtering to the first input value, the outlier removal filter is configured to replace an outlier value, which is a value outside a specific range among input values within the measurement window, with a replacement value, a minimum value in the specific range is a value obtained by subtracting a standard deviation of the input values within the specific range from a mean of the input values within the specific range, and the maximum value in the specific range is a value obtained by adding the standard deviation of input values within the specific range to the mean of input values within the specific range, and the replacement value is a mean value of input values remaining after excluding the outlier value from input values within the measurement window.

* * * * *